United States Patent [19]

Fischer et al.

[11] Patent Number: 4,557,661
[45] Date of Patent: Dec. 10, 1985

[54] ROBOT SAFETY MECHANISM

[75] Inventors: Robert L. Fischer; Frank C. Pulcrano, both of Huntington; Lee C. Coldiron, Barboursville; Terry M. Topping, Huntington, all of W. Va.; J. H. Potter, Chesapeake, Ohio; Robert H. Owens, Huntington, W. Va.

[73] Assignee: ACF Industries, Incorporated, Earth City, Mo.

[21] Appl. No.: 418,931

[22] Filed: Sep. 16, 1982

[51] Int. Cl.[4] ............................................. B25J 19/00
[52] U.S. Cl. ..................................... 414/730; 901/33; 901/49; 403/2
[58] Field of Search .................... 414/730; 901/31–35, 901/46, 49; 403/2

[56] References Cited

U.S. PATENT DOCUMENTS

| 3,145,333 | 8/1964 | Pardini | 901/46 X |
| 4,332,989 | 6/1982 | Nicolaisen | 901/49 X |

FOREIGN PATENT DOCUMENTS

| 407974 | 8/1968 | Australia | 901/33 X |
| 143226 | 8/1980 | Fed. Rep. of Germany | 901/49 X |
| 3025952 | 2/1982 | Fed. Rep. of Germany | 403/2 |
| 57-2019 | 6/1982 | Japan | 901/49 X |
| 795939 | 1/1981 | U.S.S.R. | 901/49 X |

Primary Examiner—Terrance L. Siemens
Attorney, Agent, or Firm—Polster, Polster & Lucchesi

[57] ABSTRACT

In accordance with the present invention an industrial robot (10) having a lifting or gripping arm (16) is provided with electrical switch means (44) whereby if a work piece extends too far into the lifting or gripping portion the machine is automatically turned off. In accordance with another feature of the invention, shear means (54, 56, 58, 60, 62, 64) are provided in the lifting or gripping arms (30, 32) whereby if one or both arms abut an obstruction with sufficient force, the arm will shear off causing only minimal damage to the robot and protecting valuable gear mechanisms and control apparatus.

2 Claims, 6 Drawing Figures

ROBOT SAFETY MECHANISM

BACKGROUND OF THE INVENTION

This invention relates to industrial robots.

In recent years industrial robots have become relatively highly developed. For example in U.S. Pat. No. 3,661,051 granted May 9, 1972, hereby incorporated into the present application by this reference, a rotatable robot or programmed manipulator is disclosed which employs a continuously rotating memory drum in which may be stored signals representing a number of steps in a desired sequence of operations. A portable teach control assembly is employed during the teaching operation to establish a desired position of the manipulator arm which is then recorded on the memory drum. During repetitive work cycles, the recorded signals are used as command signals and are compared with encoder signals representing absolute position to move the manipulator arm to each set of positions in sequence. The manipulator arm may be moved over curved paths by employing artificial coincidence signals which are developed while large error signals still exist in the controlled axes. A common comparator and digital-to-analog converter is employed for all of the controlled axis which provides coincidence signals representing different magnitudes of error.

In U.S. Pat. No. 3,888,361, June 10, 1975, hereby incorporated into the present application by this reference a fixed base programmed manipulator arrangement is provided for cooperation with a continuously moving conveyor wherein the manipulator is positioned so that one axis such as the out-in-axis, is parallel to the conveyor. Synchronous operation with the conveyor while permitting limited lateral movements of the manipulator arm is achieved by employing a digital conveyor encoder as a source of continuously varying command signals for the out-in-axis of the manipulator. The arrangement does not require positioning of the conveyor at a large number of points along its path during the initial teaching mode of the manipulator apparatus.

In U.S. Pat. No. 3,525,382, Aug. 25, 1979, hereby incorporated into the present application by this reference, use of such a robot or programmable manipulator is disclosed for applicators in die casting and forging, and an infrared heat detector is utilized; and in U.S. Pat. No. 3,654,613 granted Apr. 4, 1972, the use of such a manipulator is specifically disclosed in connection with running hot billets from a furnace moving the billets into a press to be molded or stamped, and then remove the finished part from the press and place it in a receptacle. Moreover, in accordance with a further phase of the invention, the artificial end-of-program signal may be externally developed in response to a heat-sensing device, or other facility for sensing a characteristic of the part which is carried by the manipulator arm. If the desired characteristic is not detected by the sensing means, an artificial end-of-program signal is developed which causes the manipulator arm to be returned to its initial position without completing the entire program.

For example, one industrial robot is called an Unimate, trademark of Unimation, Inc. of Shelter Rock Lane, Derby, Conn. 06810. One model, the 4000B "is an industrial robot with a hydraulically powered arm having six programmed articulations and either a pneumatically-operated clamping/tooling device or a weld gun (usually called the "hand") at its outer end. A built-in digital memory system, in combination with an all solid-state electronic system, controls servo drives to move the arm-and-hand assembly through as many as six different basic types of movement. Three of these are arm motions: O: Out-in (radial extension or retraction); D: Down-up (vertical rotation); R: Rotary (waist rotation). The other three are motions of the wrist assembly. B: Bend (depression or elevation); Y: Yaw (rotation clockwise or counterclockwise); S: Swivel (rotation clockwise or counterclockwise). In each of the six motions, the prime moving force is generated by a hydraulic actuator under control of a servo valve. Hydraulic actuators for out-in and down-up motions are connected directly to their respective loads. For rotation, a rack and ring gear convert linear travel of pressure-balanced hydraulic pistons into rotary motion. A spring-loaded cylinder applies a constant engaging force to the rack to prevent backlash. Force generated by bend, swivel, and yaw actuators is transmitted by a system of chains, shafts, and gears to the respective loads. Since the wrist moves in and out with the arm, a ball-nut and spline-shaft arrangement provides means for transmitting power to these motions throughout the entire range of arm (boom) out-in motion. Bevel gears permit compact arm geometry. Hydraulic power for operation of the Unimate is provided by a complete self-contained hydraulic system." See Equipment Manual 398E1, May 1978, hereby incorporated into the present application by this reference.

However, even with all the sophisticated controls described in the above publications, it has been found that an industrial robot will occasionally abut an obstruction causing expensive damage and down time of the robot.

When the robot is fitted with a clamping or tooling device, it is frequently used to lift and place a work piece such as metal stock or formed articles in one or a series to desired stations and/or storing position.

The clamping or tooling device comprises a pair of laterally spaced outwardly exending fingers used to grasp a work piece. Preferably each finger includes a contoured claw at its outer end to aid in holding the work piece as it is transferred between stations.

The fingers are movable away from each other to place the work piece at a desired station.

The fingers extend outwardly from a gear box which allows 360° of rotation of the fingers about a horizontal axis. Another gear allows at least 180° of finger movement about a vertical axis. The fingers and supporting structure are also movable back and forth relative to the robot arm.

SUMMARY OF THE INVENTION

In accordance with the present invention an industrial robot having a lifting or gripping arm, is provided with electrical switch means whereby if a work piece extends too far into the lifting or gripping portion, the machine is instantly commanded to stop all movement.

In accordance with another feature of the invention, shear means are provided in the lifting or gripping arm whereby if the arm or work piece being gripped in the arm abuts an obstruction with sufficient force, the arm will shear off causing only minimal damage to the robot and protecting valuable gear mechanisms and control apparatus.

IN THE DRAWINGS

DESCRIPTION OF PREFERRED EMBODIMENTS

Figure 1:
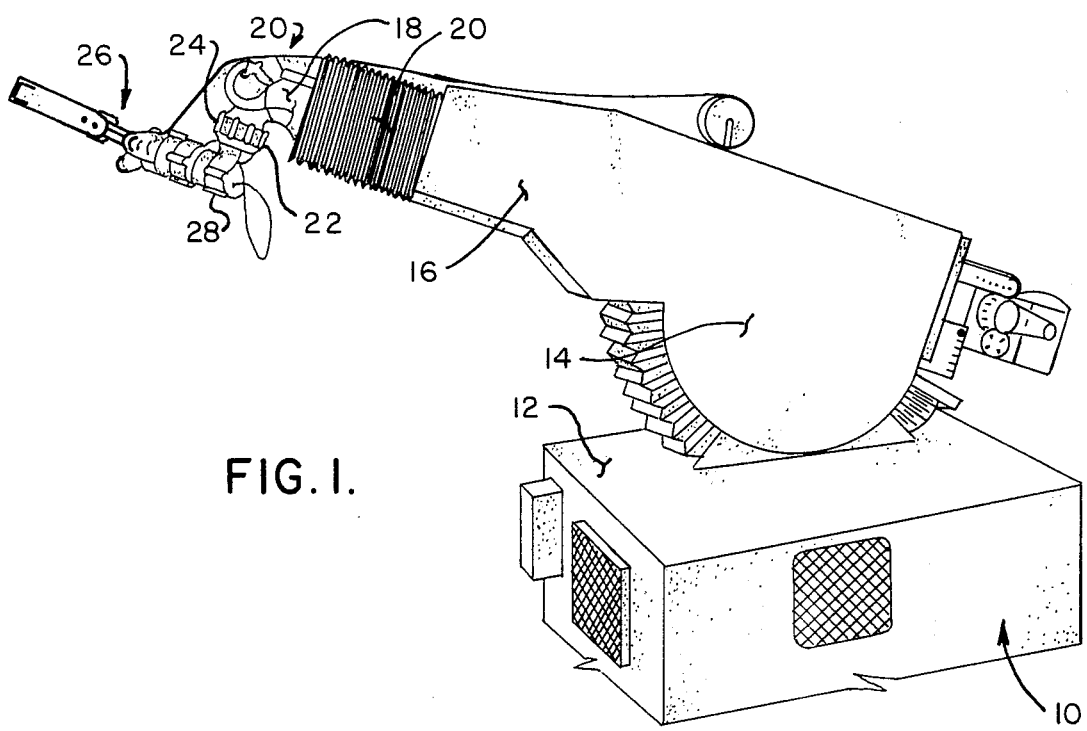
FIG. 1 is a perspective view illustrating the robot of the present invention.
Figure 2:
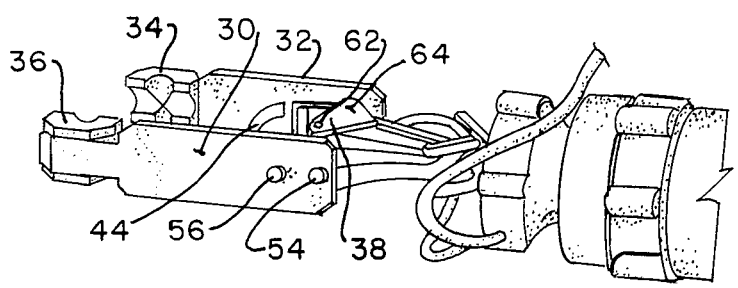
FIG. 2 is a perspective view of the gripping arms and gear assembly of the robot.
Figure 3:
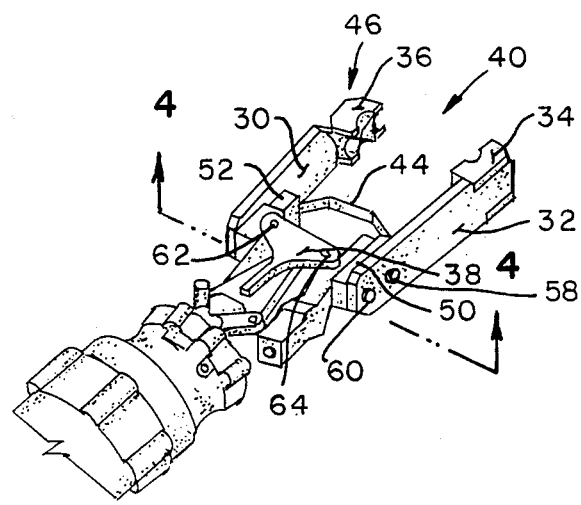
FIG. 3 is a perspective view illustrating the switch means and shear means of the present invention.

An Unimate ® 4000 or manipulator is indicated in the drawings at 10. This manipulator includes a base 12 about which the Unimate body portion 14 is mounted. The body portion 14 may rotate 360° about the base portion 12. In addition the body portion may pivot upwardly or downwardly about a horizontal axis extending through the body portion. The body portion includes an outwardly extending boom 16. The boom 16 has extending outwardly therefrom a leg portion 18. The leg portion 18 is partially surrounded by a flexible protective covering 20 which moves inwardly and outwardly with the portion 18. At the outer end of portion 18 is located a gear assembly 20. Gear assembly 20 transfers movement 90° from horizontal to a vertical portion 22. Another gear member 24 allows rather substantial horizontal movement about a vertical axis for an arm assembly indicated at 26. This arm assembly includes a gear 28. Gear 28 controls the ability of a pair of outwardly extending arms 30 and 32 to rotate about a horizontal axis passing through the gear 28. Each of the arms 30 and 32 include respective grippers 34 and 36.

Each of the arms 30 and 32 are connected to a transversely extending base 38, which with the arms 30 and 32 defines a pocket 40.

As mentioned above, the portion 18 is movable outwardly from the boom 16. A work piece P normally is gripped by the portions 34 and 36. The work piece is transferred from station to station. However, if the work piece is being moved longitudinally outwardly from the base 12, and the work piece abuts an obstruction, the work piece will tend to be forced rearwardly and into the laterally extending portion 38. If continued outward movement is carried on, one or more of the foregoing gear assemblies can be seriously damaged or ruined by further movement of the work piece into the base portion 38.

Therefore in accordance with one feature of the present invention, a switch means 44 is provided between the outwardly extending arms 30 and 32. In one embodiment the switch means comprises a contact member 46 extending from one side 48 of the base portion. The contact 46 is mounted upon an insulating support 50 with mechanical fasteners 51. The contact 46 extends transversely between the arms 30 and 32, and by its own resiliency is biased outwardly from another contact support 52. In the event that a work piece is forced rearwardly by virtue of an impact, the work piece will engage the contact member 46 and move it rearwardly and cause it to make physical contact with contact 53. This physical contact completes an electrical circuit which energizes a relay 208 discussed hereinafter. The relay immediately stops all motion of the robot. Manual operation of a "reset" pushbutton is required to reinitiate robot movement. Thus it is seen that the switch means of the present invention prevents damage to the outwardly extending gear assembly 20 by turning off the robot in the event that the work piece or one of the arms 30 and 32 engage an obstruction which forces switch means 44 to the closed position.

Figure 4:
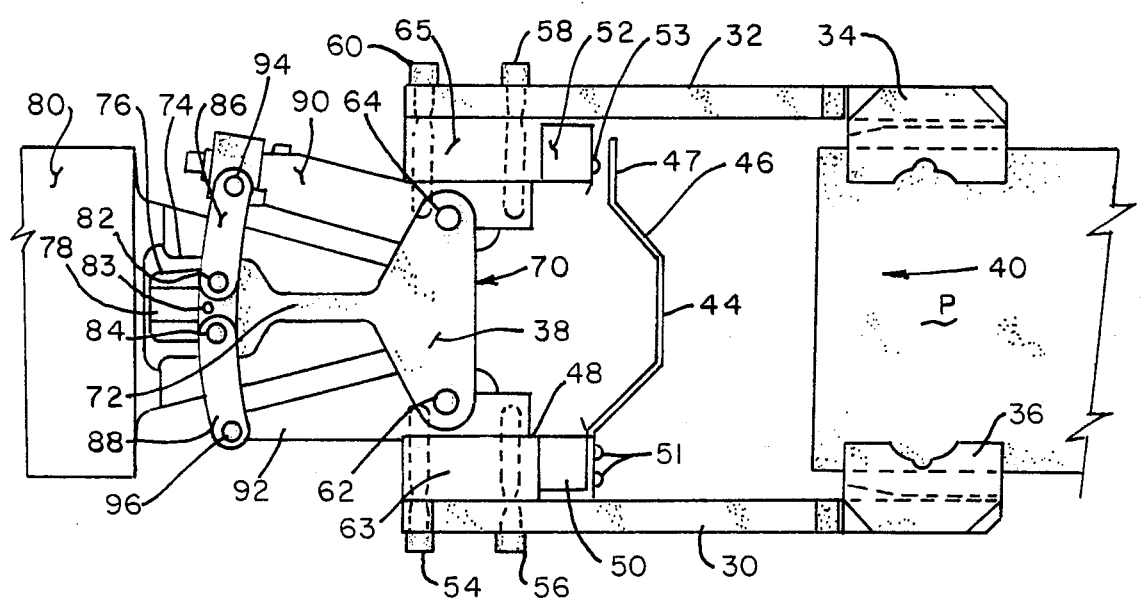
FIG. 4 is a bottom view of the gripping assembly of the robot illustrating the switch means, shear means, and opening and closing assembly for gripping a work piece.

As mentioned above, the boom and outwardly extending arms 30 and 32 are capable of a wide variety of movement other than back and forth. With all other types of movement, in accordance with another feature of the present invention, shear bolts are provided in the connection between the outwardly extending arms or fingers and base portion to absorb impacts which may occur between the arms or fingers and any adjacent rigid structure. Thus as shown in FIG. 4, a pair of horizontally extending shear bolts 54 and 56 are provided which connect the arm 30 with the base portion 38. In addition, another pair of pins 58 and 60 are provided which connect arm 32 with the base portion 38. The shear pins may be made of a material having a known tensile strength to assure that they will shear at a predetermined force.

It will be apparent that impacts to either or both of the outwardly extending arms will create a moment about the shear pins 54, 56, 58 and 60. Alternatively, the shear point may be controlled by machining or otherwise forming a groove in the shear pin. It will be readily apparent to those skilled in the art, that it is much less expensive to replace one or more shear pins than either of the arms 30 or 32 or the expensive gear mechanisms 20, 24 and 26. In some experiments carried out by the assignee prior to the present invention, it was necessary to spend $3,000 plus down time of the apparatus because of the damage to the gear mechanism 20.

In accordance with another embodiment of the present invention, a pair of supplemental vertically extending pins 62 and 64 are also provided. Pins 62 and 64 permit the arms 30 and 32 to become disconnected from the base portion. These pins are utilized for example in the event that the switch fails to operate satisfactorily and turn off the apparatus in the event of a longitudinal impact force applied to the base portion. Furthermore, the pins 62 and 64 function as a back-up for the pins 54, 56, 58 and 60. Should the pins 54, 56, 58 and/or 60 fail to shear at prescribed strength levels upon impact to either or both arms, the pins 62 and 64 will fail at a somewhat higher applied force. Preferably, the pins 54, 56, 58 and 60 are designed to shear at 3000-4000 psi. Preferably, the pins 64 and 66 are designed to shear at 2500-3500 psi.

Pins 62 and 64 extend downwardly through laterally extending portion 38 of a pivot member indicated generally at 70. Pivot member 70 including laterally extending portion 38 also includes a connecting portion 72 and a base portion 74. Base portion 74 includes an opening 76 which receives a ram 78 which extends into a fluid cylinder 80.

Also located within opening 76 are a pair of pins 82 and 84 respectively extending through links 86 and 88 which respectively at their distal end engage legs 90 and 92 by means of pins 94 and 96. Pins 62 and 64 extend into legs 90 and 92.

In FIG. 4, arms 30 and 32 are shown in the engaged position with grippers 34 and 36 engaging a work piece P. In order to disengage the work piece P, hydraulic fluid is introduced into cylinder 80 and the piston head 79 is displaced from right to left. The ends of links 86 and 88 are connected to the distal end of ram 78 with a pin 83. This moves the piston head 79 and ram 78 from right to left. When this occurs pins 82 and 84 of links 86 and 88 move from right to left. Also, the distal end portion of links 86 and 88 including pins 94 and 96 move inwardly toward the center line of the assembly. When this occurs, legs 90 and 92 pivot about the pins 62 and 64 and arms 30 and 32 move outwardly. Grippers 34 and 36 in turn move outwardly and become disengaged from the work piece P.

Figure 5:
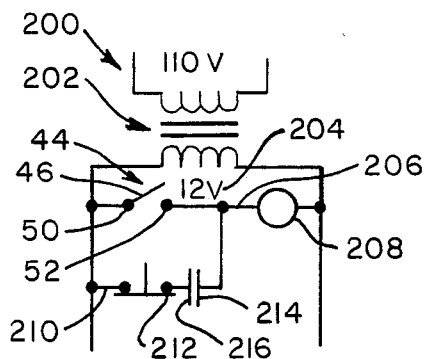
FIG. 5 is a schematic view illustrating the circuit in which the switch means of the present invention is located.

It will be apparent that when hydraulic fluid is applied to the opposite side of piston head 79, that ram 78 moves from left to right, links 86 and 88 move to their outer position as shown in FIG. 5, and legs 90 and 92 pivot about pins 62 and 64 with commenserate movement of arms 30 and 32 inwardly. A work piece P is then gripped by the gripping portions 34 and 36. Fasteners 98 hold base portion 75 in engagement with a spacer 99.

Figure 6:
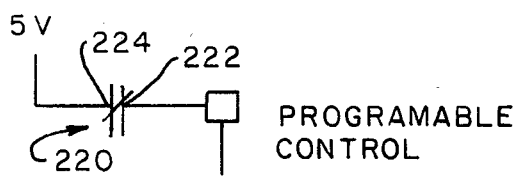
FIG. 6 illustrates a circuit whereby when the switch means of the present invention is activated the console is disconnected from the robot so that when the switch means is connected the robot become inactive.

In FIGS. 5 and 6, a circuit is illustrated for the operation of switch means 44. In a circuit 200, a transformer 202 transfers 110 volts to a secondary 204 having 12 volts. The secondary 204 is in parallel with a first circuit 206 including switch means 44 and a relay 208. In a second circuit 210, a reset button 212 is in series with a pair of normally open contacts 214 and 216 located on relay 208.

In another circuit 220 (FIG. 6) from the robot console, a programmable controller is in series with another pair of contacts 222 and 224 which are normally closed, and which are operated by the coil of relay 208. Five volts D.C. must flow in this circuit for the programmable controller to allow movement of the robot.

If it is assumed that the arms 30 and 32 extend outwardly too far and the work piece P engages an obstruction and is forced rearwardly into engagement with the contact arm 46 and then the end portion 47 of the arm engages the contact 53, the circuit 206 will become operative. This activates relay 208. As soon as relay 208 is activated, the contacts 214 and 216 will be closed. This will cause the circuit 210 to be operative. When this occurs, current will be flowing both through the circuits 206 and 210, and through the relay.

However, activation of the relay 208 will move the contacts 222 and 224 which are normally closed, apart. Thus the programmable controller is disconnected from the robot console and further steps by the programmable controller will not be transmitted to the robot console. This results in the robot console being in the hold position and no activity is occurring. At this time the attendant will free the work piece and/or the arms 30 and 32 from the obstruction. Moreover, the work piece P will be moved outwardly from the switch means 44 until contact no longer occurs between the switch element 47 and the contact 53. When this occurs, the circuit 206 will become open. However, current is continuing to flow through the circuit 210 to the relay 208.

However, when the attendant has disengaged the work piece P from the obstruction and has moved it into proper position as shown in FIG. 4 with the contact 47 spaced from the contact 53, the attendant can then press the reset button 212. When he presses the reset button 212, the circuit 210 is deactivated and the contacts 214 and 216 automatically move apart. Similarly, the contacts 222 and 224 on relay 208 move back together into the position shown in FIG. 7. The programmable controller is then operative to control action of the robot console. The robot will then return to the series of operations provided in the programmable controller.

However, it will be noted that the apparatus has not been damaged and new parts are not required and the robot is not taken out of operation for a significant period of time due to necessary repairs or lack of necessary parts.

It is thus seen that with the electrical switch means and shear pin of the present invention, the expensive gear mechanism of the robot and its control system is protected from impacts which the robot arm may encounter in moving a work piece between work stations. Savings of up to $3,000 and higher for a new gear mechanism and savings of avoiding down time are thus achieved with the present invention.

What is claimed is:

1. In a robot having a base portion and an outwardly extending boom pivotally mounted thereon; a pair of arms extending outwardly from said boom, the improvement comprising: shear pin means connecting said arm to said boom whereby impact of a predetermined force applied to said arms will shear said arms from said boom at a force sufficiently low to avoid significant damage to said boom; and switch means located between said arms effective to stop movement of said robot in the event of a longitudinally applied load between said arms, said switch means being in series with a relay and being in parallel with a reset button, said reset button being in series with at least one contact on said relay, and at least one normally closed contact on said relay being located in a series circuit which must carry current to allow movement of the robot.

2. In a robot having a base portion and an outwardly extending boom pivotally mounted thereon; a pair of arms extending outwardly from said boom, the improvement comprising: shear pin means connecting said arm to said boom whereby impact of a predetermined force applied to said arms will shear said arms from said boom at a force sufficiently low to avoid significant damage to said boom; and switch means located between said arms effective to stop movement of said robot in the event of a longitudinally applied load between said arms, switch means latching when energizing and inhibiting robot movement until a reset button is operated, said reset button being in series with at least one contact on said relay, and wherein at least one normally closed contact on said relay is located in a series circuit which must carry current to allow movement of the robot.

* * * * *